United States Patent [19]

Bertling

[11] 4,083,342
[45] Apr. 11, 1978

[54] FUEL MIXTURE REGULATOR SYSTEM
[75] Inventor: Johannes-Gerhard Bertling, Vaihingen, Germany
[73] Assignee: Robert Bosch GmbH, Stuttgart, Germany
[21] Appl. No.: 717,141
[22] Filed: Aug. 24, 1976
[30] Foreign Application Priority Data Sep. 3, 1975   Germany .............................. 2539097

[51] Int. Cl.² ........................................... F02M 23/04
[52] U.S. Cl. ........................... 123/124 B; 123/119 D; 123/119 EC; 123/124 R; 123/139 AW; 261/50 A; 261/45; 261/54
[58] Field of Search ........... 173/124 R, 124 B, 124 A, 173/127, 119 DB, 119 D, 119 EC, 139 AW; 261/50 A, 45, 54

[56] References Cited
U.S. PATENT DOCUMENTS

| | | |
|---|---|---|
| 3,364,911 | 1/1968 | Baudry et al. .................... 123/127 |
| 3,688,752 | 9/1972 | Baudry .............................. 123/124 R |
| 3,759,232 | 9/1973 | Wahl et al. .................... 123/119 DB |
| 3,977,375 | 8/1976 | Laprade et al. .................. 123/124 B |
| 4,007,718 | 2/1977 | Laprade et al. .................. 123/124 B |
| 4,010,722 | 3/1977 | Laprade et al. ................. 123/124 R |
| 4,015,568 | 4/1977 | Horiye et al. ..................... 123/124 R |

Primary Examiner—Wendell E. Burns
Attorney, Agent, or Firm—Edwin E. Greigg

[57] ABSTRACT

The fuel preparation system of an internal combustion engine is provided with an air bypass line which delivers fresh air directly to the intake manifold downstream of the mixture generator, which may be a carburetor, for example. The air flow through the bypass is controlled, firstly, by a valve actuated in synchronism with an air flow meter in the main induction tube and, secondly, by a pressure controlled valve. The pressure controlled valve is connected to sources of different pressure by solenoid valves which are operated on the basis of engine information, for example the exhaust gas composition.

27 Claims, 4 Drawing Figures

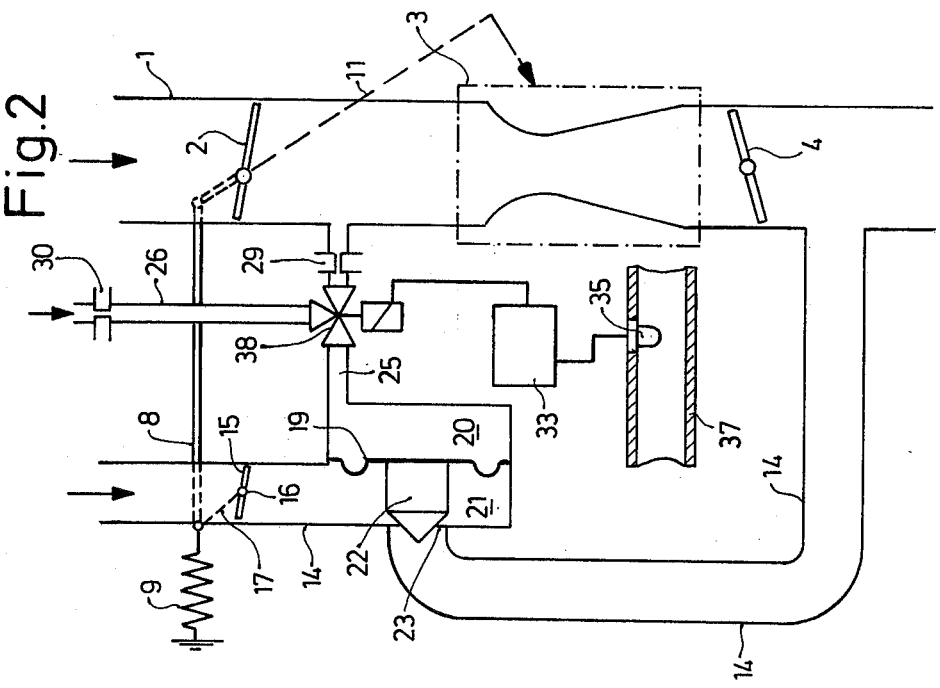
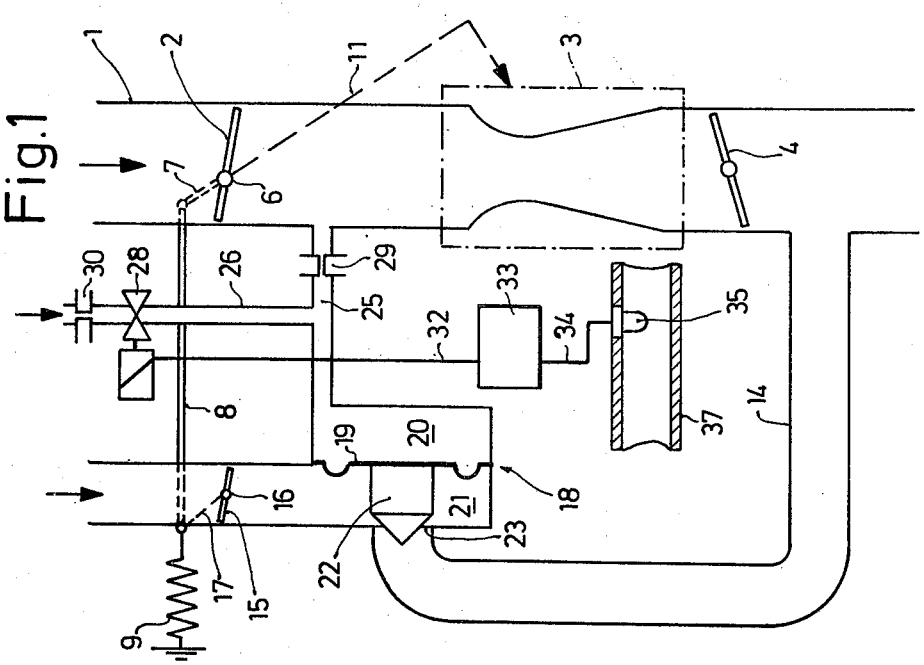

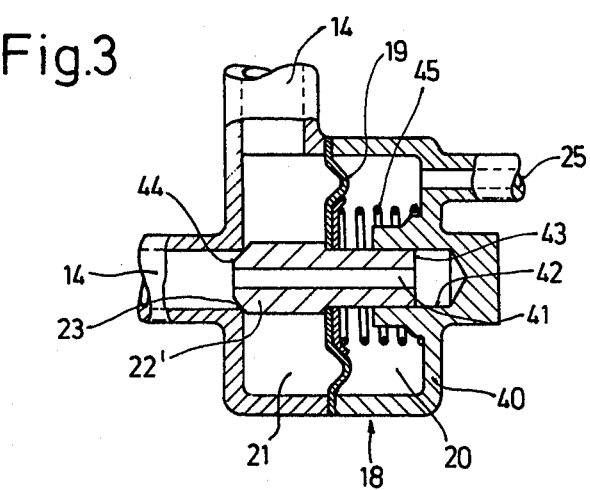
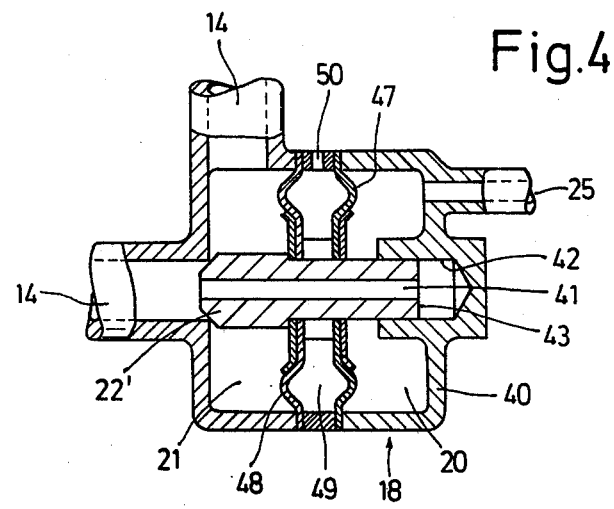

FUEL MIXTURE REGULATOR SYSTEM

BACKGROUND OF THE INVENTION

The invention relates to a method and an apparatus for regulating the fuel-air mixture provided to an internal combustion engine. The regulation includes the supply of supplementary air to be added to a fuel-air mixture generated in a mixture generator in dependence on the operational state of the internal combustion engine.

In a known method of this type, the oxygen content of the exhaust gases is monitored and additional air is metered out by a by-pass valve in dependence on the exhaust gas oxygen content. In that system, an electronic controller determines the throttle position as well as the engine rpm to define a basic setting of the by-pass valve while the oxygen content in the exhaust gases superimposes a further opening motion of the valve. This type of known regulation requires a fairly substantial and expensive controller. Furthermore, the quantity of actually aspirated fuel-air mixture can be determined only by the throttle valve position together with the rpm signal or the vacuum in the induction tube. Thus, two measured quantities are required in order to find the parameter whose exact measurement is most important and that parameter is then processed to provide a setting signal for the by-pass throttle valve.

OBJECT AND SUMMARY OF THE INVENTION

It is a principal object of the invention to provide a method and an apparatus for rapid and precise fuel mixture regulation while maintaining a relatively low cost.

This and other objects are attained according to the invention by providing an air flow rate meter which determines the aspirated air quantity and by admitting supplementary air in a by-pass line depending on the mesaured air quantity. The amount of supplementary air is altered in multiplicative fashion by controlling the pressure at the point of metering. This control is exerted by a pressure control valve whose operating pressure is varied, depending on the operational state of the engine, between some constant pressure and the pressure which prevails downstream of the air flow rate meter.

In an apparatus provided to carry out the above method, there is provided, in an internal combustion engine which has a mixture generator and a throttle valve in the induction tube, an air by-pass line which terminates in the induction tube downstream of the throttle valve. The free flow cross section of the air by-pass line may be changed by a flow valve. Upstream of the mixture generator and of the throttle valve there is provided in the induction tube an air flow rate meter which is actuated by the difference of pressures upstream and downstream thereof and which is coupled to the main throttle. Downstream of the flow valve, the by-pass air line is provided with a pressure control valve whose valve closing element is coupled to a diaphragm which defines two work chambers. One of the work chambers receives the pressure upstream of the pressure control valve and the other chamber receives a control pressure from downstream of the air flow rate meter. The second chamber is also connected to a pressure source having substantially constant pressure via a line containing a valve that may be actuated in dependence on engine parameters.

The method and the apparatus of the invention permit a rapid and exact measurement of the air quantity provided to the engine and, at the same time, permit adjusting the appropriate additional air quantity in a proportional manner.

The rapid and exact regulation process is further enhanced by the multiplicative engagement of the pressure level downstream of the flow valve.

An advantageous embodiment of the invention provides that the exhaust system includes an exhaust gas measuring sensor, in particular a per se known oxygen sensor, for measuring the exhaust gas composition in order to determine the operation behavior of the engine. The pressure control valve is then actuated depending on the magnitude of the signal from the oxygen sensor. In this manner, the exhaust gas composition, in particular the toxic components thereof, is measured so that the combustible mixture fed to the engine may be changed so as to provide a desired exhaust gas composition.

Another advantageous embodiment of the invention provides a transducer for monitoring the fluctuations of the pressure in the combustion chambers of the engine. That transducer may be, in particular, a per se known transducer which generates an engine smoothness signal.

A further advantageous feature of the invention is that the conduit from the first work chamber of the pressure control valve to the induction tube as well as the pressure line includes a throttle. A second favorable embodiment of the invention provides a three-way valve in the conduit from the first work chamber to the induction tube. This arrangement has the advantage that, depending on the position of the three way valve, the control pressure chamber receives its pressure exclusively from the induction tube region lying between the air flow rate meter and the mixture generator or gets a constant pressure from a pressure source of the system. Thus, another feature of the invention permits the pressure source to be the atmospheric air or the air within the induction tube upstream of the air flow rate meter and thus the entire pressure difference between the control pressures may be utilized. Intermediate pressures may also be admitted.

The invention will be better understood as well as further objects and advantages thereof become more apparent from the following detailed description of several exemplary embodiments taken in conjunction with the drawing.

BRIEF DESCRIPTION OF THE DRAWING

FIG. 1 is a schematic diagram of the first exemplary embodiment of an apparatus according to the invention;

FIG. 2 is a schematic diagram of the second exemplary embodiment of an apparatus according to the invention;

FIG. 3 is a sectional diagram of a first version of a pressure control valve to be used in the apparatus of the invention; and FIG. 4 is a sectional diagram of a second version of the pressure control valve to be used in the invention.

DESCRIPTION OF THE PREFERRED EMBODIMENTS

Turning now to FIG. 1, there is shown a portion of an induction system of an internal combustion engine not further illustrated. The induction tube 1 includes, in sequence, an air valve 2, a fuel-air mixture generator 3 and an arbitrarily actuatable throttle valve 4. The air valve 2 can obturate the induction tube and is carried in unsymmetric manner on a shaft 6. An arm 7 and linkage 8 connected to the shaft 6 cause a spring 9 to urge the air valve to close the induction tube. Since the air valve is borne on its shaft in unsymmetric manner, a differential pressure will cause it to open the induction tube in opposition to the force of the spring. Thus, the air valve and its return spring constitute a known air flow rate meter whose displacement is a measure of the aspirated quantity of air. The spring and the points of attack of the spring as well as the possible use of a cam plate or some other known mechanism for changing the point of attack of the spring, permits providing a resetting force which is such that, in any position of the valve, i.e., in the entire domain of air flow, there is produced an approximately constant pressure difference across the air valve itself.

The dashed line 11 indicates an actuation with respect to the mixture generator 3 which produces a combustible mixture corresponding to the position of the air valve. This includes the possibility of having the air flow rate meter a part of the mixture generator itself. The mixture generator 3 is indicated in FIG. 1 as a venturi but may be of any known construction, for example a carburetor or a fuel injection system.

The throttle valve 4 may be actuated by a gas pedal which is not shown according to any desired load, and downstream thereof, a by-pass line 14 terminates in the induction tube. The by-pass line 14 is intended to provide the engine with fresh air, preferably filtered air, taken for example from the induction tube 1 immediately downstream of an air filter (not shown). The by-pass air line includes a by-pass valve 15 which pivots in symmetric manner about a shaft 16. Levers 17 connect the shaft 16 with the linkage 8 so that the actuation of the by-pass valve takes place at the same time as the rotation of the shaft 6. It would be suitable to mount the air valve 2 and the by-pass valve 15 on a common shaft; in that case, the shaft 16 would be merely the extension of the shaft 6 and the linkage 8 would not be needed. The relative adjustment of the air valve 2 and the by-pass valve 15 is such that they both close together. Downstream of the by-pass valve 15, the line 14 includes a pressure control valve 18 which has a control diaphragm 19 that divides the interior of the valve 18 into a control pressure chamber 20 and a work chamber 21. Fastened to the diaphragm is a valve-closing element 22 which controls the free aperture of an orifice 23. The pressure prevailing in the work chamber 21 is the pressure downstream of the by-pass valve 15.

The control pressure chamber 20 is connected via a line 25 with an induction tube region lying between the air valve and the mixture generator 3. Branching off from this connecting line is a pressure line 26, controlled by valve 28, which leads to ambient air or to an induction tube region immediately downstream of the air filter. If the pressure line 26 goes directly to outside air, it is advantageous to provide it with a filter. In the section between the pressure line 26 and the induction tube, the line 25 includes a flow throttle 29, while a flow throttle 30 is included in the pressure line 26.

The valve 28 is a solenoid valve, controlled by a controller 33 acting through a line 32. In one embodiment of the invention, the controller receives its input signal from an exhaust gas sensor 35 via a line 34. Preferably, the exhaust gas sensor is an oxygen sensor of known construction and resides in a portion 37 of the exhaust gas system of the engine (not further described).

As is well known, when the so-called air number obeys the relation of $\lambda = 1$, the oxygen sensor 35 provides a switching signal which may be used as an input for the controller 33. By suitable construction of the oxygen sensor and of the controller, any desired air number may be used as the nominal command variable of the control loop. Controllers of this type have been described in several publications and thus will not be discussed in detail here. Depending on the construction of the controller, the solenoid valve 28 receives a suitable control pulse which either opens or closes the valve. Other controllers are known in which an armature in the magnetic valve is displaced in proportion to the magnitude of the oxygen sensor's signal or in proportion to the frequency of occurrence of the oxygen sensor signal so that the flow cross section of the valve 28 may be varied continuously. The valve 28 may also be controlled cyclically by a suitable controller.

In similar manner, other engine parameters which define the operational state of the engine may be used for controlling the apparatus of the invention by use of a suitably constructed controller. One of these parameters may be, for example, the engine smoothness. For that application, a transducer is provided for monitoring the fluctuation of the pressures in the combustion chambers of the engine. It has also been proposed to measure the ion currents in the combustion chambers to provide an input signal for an engine controller. All such controllers would be usable for the method and the apparatus of the present invention. Even the exhaust gas compositions may be measured in any known manner, for example by exhaust gas temperature measurements.

The operation of the apparatus according to the invention is as follows: If the throttle valve 4 is displaced, the changing induction tube pressure travels toward the air valve 2 so that a higher pressure difference occurs there than would correspond to its equilibrium position. Thus, the air valve 2 is displaced until the original pressure is re-established in the space between the air valve and the mixture generator 3, due to the reduced throttling effect on the inflowing fresh air at the air valve. Thus, depending on the construction of the air flow rate meter, the induction tube region between the air valve and mixer generator 3 has a substantially constant pressure. This pressure is admitted through the line 25 to the control pressure chamber 20 of the pressure control valve 18 which, therefore, experiences that minimum pressure as long as the valve 28 remains closed. Accordingly, the diaphragm and the air valve closing element assume a position such that the pressure in the by-pass line 14 between the pressure control valve and the by-pass valve 15 is constant. Depending on the displacement of the by-pass valve 15, the flow aperture 23 is increasingly open so that constant pressure is maintained downstream of the by-pass valve. Thus, supplementary air may be provided in the same ratio as the position of the air flow valve 2 of the engine. This air quantity may, however, be varied by actuating the valve 28 according to the magnitude of the sensor's signal. When the valve 28 is opened, the control pressure chamber 20 receives a mixed pressure whose magnitude is determined by the flow throttles 29 and 30 and by the duration of opening of the valve 28, and the intermediate pressure is higher than the initial pressure. Accordingly, the region of the by-pass line between the by-pass valve 15 and the pressure control valve 18 receives a higher pressure than before and thus a lower quantity of air is fed to the engine.

The flow throttles 29, 30 define the highest possible pressure available to the control pressure chamber 20. These throttles can also be used to adapt the pressure increase and decrease rates to one another in order to obtain a smooth control behavior. If the valve 28 is a valve having a continuously controllable opening cross section (a proportional valve), the throttle 30 in the pressure line 26 may be dispensed with. Similarly, if the lines 25 and 26 are appropriately dimensioned and the volume of the control pressure chamber 20 is chosen properly, the flow throttles 29 and 30 may both be dispensed with. An integral control behavior may thus be obtained by pneumatic means. If necessary, the control pressure chamber may be enlarged so as to be adapted to account for flow resistances inherent in the throttle and the valve.

In the illustrated exemplary embodiment of FIG. 1, the throttling device of the by-pass line is a by-pass flap valve. It will be understood that any other suitable adjustable throttle elements, such as slides, rotating valves and other similar throttles could be used in its place. In the same manner, the mechanical linkage between the air valve and the by-pass valve may be replaced by a suitable electro-mechanical linkage or a pneumatic or hydraulic linkage. The air flow rate meter illustrated may also be replaced by any other known and suitable air flow rate meter which operates on the basis of the differential pressure so as to maintain a substantially constant pressure downstream thereof. For example, a constant pressure carburetor or a known air flow rate meter in which a baffle plate displaces a lever in opposition to a substantially constant restoring force would be suitable. If the air flow rate meter is already a part of the mixture generator 3, the displacement of the air flow rate meter may be transmitted to any suitable throttle element in the air by-pass line in any suitable manner. The pressure control valve in the embodiment described above may be replaced by a throttle flap valve controlled by a pressure cell.

A second, substantially similar exemplary embodiment of the invention is illustrated in FIG. 2. In contrast to the embodiment of FIG. 1, the valve 28 is replaced by a three-way valve 38 located in the branch point of the line 26 from the connecting line 25. This valve is actuated by a controller 33 in the same manner as described above, i.e., by an exhaust gas sensor 35 located in the exhaust system 37 of the engine. Preferably, the three-way valve is operated by the controller in analog fashion. Thus, depending on the rotation of the valve, an intermediate pressure somewhere between the pressure downstream of the air valve and the pressure upstream of the air valve may be admitted. The flow throttles 30 and 29 are used especially for adapting the rates of pressure change. Alternatively, a magnetic switching valve may be used which may be operated cyclically or continuously for obtaining a pneumatic or electronic integral control behavior; shut-off valves operating in opposed phase may also be used.

While the pressure line 26 is shown to receive ambient air, it would be possible to use any other source of constant pressure, connected, depending on the requirements of the pressure control valve, to the induction tube above or below the air valve. Similarly, the control valves 28 and 38 may be actuated in dependence on any suitable engine parameter by any suitable controller.

The detailed construction of a pressure control valve 18 is illustrated in FIG. 3. The valve 18 includes a housing 40 which is divided by a diaphragm 19 into a control chamber 20 and a work chamber 21. The by-pass air conduit 14 terminates laterally in the work chamber 21 and exits at an opening 23. The valve closing element 22' is illustrated as a piston with a longitudinal bore 41. In its approximate center, the valve closing element 22' is fixedly attached to the diaphragm 19 and slides sealingly in a bore 42. The axial bore 41 carries the pressure prevailing in the by-pass line 14 downstream of the valve 18 to the rear face 43 so that the valve closing element is pressure-relieved. It would also be possible to connect the air by-pass line 14 with the bore 42 by an external conduit disposed within the housing or outside of the housing, in which case the bore 41 could be dispensed with. The control chamber 20 is seen to include a spring of soft characteristics which urges the diaphragm 19 toward the valve seat 23. It is the object of this spring to hold the valve closing element 22' in a well-defined initial position so that the response time of the valve is reduced. Depending on the requirements, the spring 45 may also be located in the work chamber 21.

A second variant embodiment of the pressure control valve 18 is illustrated in FIG. 4. Instead of providing a spring 45 to obtain a well-defined position, there are provided two symmetric diaphragms 47 and 48. The sealed space between the two diaphragms may be filled up with a medium at higher pressure than the maximum pressure in either chamber 20 or 21. For example, as illustrated in FIG. 4, the space 49 between the two diaphragms 47 and 48 may be connected to atmosphere through a bore 50, thereby defining an intermediate position of the valve closing element 22'.

As shown in FIG. 4, the effective surfaces of the diaphragms 47 and 48 may be of equal size. Thus, the work pressure is made equal to the control pressure. However, the embodiment shown in FIG. 4, in which the intermediate space 49 is pressure relieved, also permits using diaphragms of different surface. Thus, the ratio of the work chamber pressure difference to the control pressure difference may be increased in the ratio of the areas of the two surfaces.

The foregoing is a description of preferred embodiments and variants of the invention, it being understood that numerous other versions and constructions could be used within the spirit and scope of the invention, the latter being defined by the appended claims.

What is claimed is:

1. A method for controlling the fuel mixture of an internal combustion engine, said engine including a fuel mixture generator and an air intake tube, comprising the steps of:
    measuring the air flow rate through said air intake tube;
    providing a pressure controlled valve having first and second chambers for admitting supplementary air to the engine and controlling said valve by adjustment of the pressure admitted to said first chamber in dependence on the measured air flow rate;
    and further controlling said valve by adjustment of the pressure admitted to said second chamber in dependence on the valve of an engine parameter, said second chamber pressure being a constant vacuum pressure modulated by said engine parameter.

2. In an apparatus for controlling the fuel mixture of an internal combustion engine, said engine including a fuel mixture generator and an air intake tube in which is disposed a throttle valve, the improvement comprising, in combination:

an air bypass conduit, terminating in said air intake tube downstream of said throttle valve for supplying supplementary air to said intake tube;

first flow control means, disposed within said bypass conduit, for adjusting the free flow cross section of said bypass conduit;

an air flow rate meter, disposed in said air intake tube, upstream of said mixture generator and coupled to said first flow control means for simultaneous actuation of said meter and said first flow control means;

a pressure controlled valve disposed in said air bypass line downstream of said first flow control means, having two chambers separated by a diaphragm, one chamber being connected to receive upstream pressure from said air bypass line and the other chamber being connected to said air intake tube downstream of said air flow rate meter and further being connected to a source of constant pressure; and adjustable valve means connected between said second chamber of said pressure controlled valve and said source of constant pressure.

3. An apparatus as defined by claim 2, further comprising an exhaust gas sensor coupled to said adjustable valve means for valve actuation in dependence on the magnitude of the signal from said sensor.

4. An apparatus as defined by claim 2, further comprising transducer means for sensing fluctuations of the pressure in the combustion chambers of said engine for determining the operation thereof, coupled to said adjustable valve means for adjustment according to the magnitude of the signal from said transducer.

5. An apparatus as defined by claim 2, further including controller means for actuating said adjustable valve means in dependence on engine conditions, wherein said adjustable valve means is an electromagnetic valve.

6. An apparatus as defined by claim 2, wherein said adjustable valve means is an electromagnetic valve and further comprising controller means for actuating said electromagnetic valve in cyclic manner in an on-off ratio defined by operational conditions.

7. An apparatus as defined by claim 2, wherein said adjustable valve means is a three-way electromagnetic valve connected at the junction of conduits leading to said other chamber, said air intake tube and said source of constant pressure and further including electronic controller means for actuating said adjustable valve means.

8. An apparatus as defined by claim 2, wherein said adjustable valve means is a switching valve for providing alternate communication between said other chamber and said air intake tube and said source of constant pressure, respectively.

9. An apparatus as defined by claim 7, further comprising flow throttle means disposed between said other chamber and said air intake tube and also between said other chamber and said source of constant pressure.

10. An apparatus as defined by claim 9, wherein said other chamber has a supplementary space for improving the integral control behavior of said pressure control valve.

11. An apparatus as defined by claim 2, wherein said source of constant pressure is the ambient air.

12. An apparatus as defined by claim 2, wherein said pressure control valve has a valve closing element having two opposite faces both of which are exposed to pressure prevailing downstream of said pressure controlled valve.

13. An apparatus as defined by claim 12, wherein said valve closing element includes an axial bore providing for communication between respective end faces thereof.

14. An apparatus as defined by claim 12, wherein said pressure control valve further includes spring means for biasing said diaphragm.

15. An apparatus as defined by claim 12, wherein said diaphragm is composed of two membranes and including means for admitting to the space between said membranes a pressure different from the pressure prevailing in said chambers.

16. An apparatus as defined by claim 12, wherein said diaphragm includes two membranes between which atmospheric pressure prevails.

17. An apparatus as defined by claim 16, in which said two membranes have different surfaces exposed to pressure.

18. An apparatus as defined by claim 2, wherein said air flow rate meter is an unsymmetrically pivoted flap urged in the closing direction by a spring exerting substantially constant force and wherein said first flow control means is a symmetrically pivoted throttle flap.

19. An apparatus as defined by claim 2, wherein said air flow rate meter is a movable piston disposed transversely with respect to the air flow in said said air intake tube and actuated by differential pressure.

20. An apparatus as defined by claim 2, wherein said air flow rate meter is a pivotable baffle plate and includes restoring means for urging said baffle plate to close off flow in said air intake tube.

21. An apparatus as defined by claim 20, wherein said air flow rate meter and said first flow control means are operatively coupled by linkage means.

22. An apparatus as defined by claim 20, wherein said air flow rate meter and said first flow control means are disposed on a common shaft.

23. An apparatus as defined by claim 20, further comprising electromechanical means for effecting motion of said first flow control means simultaneously with motion of said air flow rate meter.

24. An apparatus as defined by claim 20, further comprising pneumatic means for effecting motion of said first flow control means simultaneously with motion of said air flow rate meter.

25. An apparatus as defined by claim 20, further comprising hydraulic means for coupling the motion of said first flow control means to the motion of said air flow rate meter.

26. An apparatus as defined by claim 2, wherein said air flow rate meter is a part of said mixture generator.

27. An apparatus as defined by claim 2, wherein said source of constant pressure is said air induction tube upstream of said air flow rate meter.

* * * * *